Patented Dec. 17, 1935

2,024,238

UNITED STATES PATENT OFFICE 2,024,238

CELLULOSE ESTER CONTAINING GROUPS OF DICARBOXYLIC ACIDS HAVING HETEROGENEOUS LINKAGES AND PROCESS OF MAKING THE SAME

Carl J. Malm and Charles R. Fordyce, Rochester, N. Y., assignors to Eastman Kodak Company, Rochester, N. Y., a corporation of New York No Drawing. Application July 30, 1932, Serial No. 627,147

14 Claims. (Cl. 260—101)

The present invention relates to the preparation of an ester of cellulose containing an acyl group of a dicarboxylic acid having heterogeneous linkages in the chain which combines the two carboxyl groups, by reacting upon a cellulosic material containing esterifiable hydroxyl groups with an anhydride of the acid in the presence of an organic base, and the product resulting therefrom.

One object of our invention is to provide a process for the preparation of the heterogeneously linked dicarboxylic acid esters of cellulose. Another object of our invention is to prepare an undegraded cellulose ester which exhibits varied solubilities and which may be employed for the preparation of various products for which cellulose esters are employed at the present time. To our knowledge up to the present time no other has ever been able to esterify a cellulosic material of any kind with a heterogeneously linked dicarboxylic acid. The term "cellulosic material" as employed herein is to be understood as referring not only to esterifiable materials consisting principally of cellulose but also as referring to cellulose derivatives such as cellulose acetate or other fatty acid esters or cellulose ethers, containing esterifiable hydroxyl groups. Cellulose acetate having an acetyl content of 30–40% would appear to be perfectly suitable as the starting material of the present process. However, various other materials, such as a cellulose ether containing esterifiable hydroxyl groups or an esterifiable cellulose such as cotton linters, sulfite pulp or a regenerated cellulose from viscose, the latter as a starting material being described and claimed in our copending application Serial No. 635,193, filed September 28, 1932, may be employed in the present invention.

We have found that a cellulose ester of a heterogeneously linked dicarboxylic acid may be prepared by reacting upon an esterifiable cellulosic material with the anhydride of a heterogeneously linked dicarboxylic acid and an organic base. We have found that for instance if a cellulose acetate containing esterifiable hydroxyl groups is treated with diglycolic anhydride in the presence of an organic base a cellulose acetate-diglycollate is formed. We have found that by this reaction the cellulosic material is esterified by only one of the two carboxyl groups and that the other carboxyl group combines during the reaction with the organic base employed therein, from which it can be later freed, if desired, by treating the resulting compound with a comparatively strong acid such as the mineral acids.

We have found that by reacting upon cellulose with a substantial amount of the anhydride of a heterogeneously linked acid in the presence of an organic base, that up to three molecules of the acid may combine with every ($C_6H_{10}O_5$) group of the cellulose, which cellulose group will hereinafter be referred to as a unit of cellulose.

The time for esterification of cellulosic material in the processes of our invention is governed to a large extent by the starting material used. For example in the preparation of a diglycollic ester if a regenerated cellulose is employed as the starting material the reaction may be completed in approximately 3 days and with a hydrolyzed cellulose acetate as the starting material the esterification may be completed in about 24 hours while in the case of a cellulose which is not readily esterifiable several weeks might be required before the completion of the esterification. The time of complete esterification in processes carried out according to our invention also depends on other factors such for instance as the temperature. We have found it generally desirable to carry out the reaction at a temperature of approximately 90–110° C. but it will be understood that higher or lower temperatures may be used. At the higher temperatures the esterification will take place in much less time, however, it is desirable that the temperature be kept sufficiently low to insure that a product will not be obtained, the properties of which have been markedly affected by degradation of the cellulose.

When the required degree of esterification has occurred the esters formed in our processes may be separated from the reaction mass by precipitation comprising pouring the reaction mass into a dilute aqueous mineral acid, which will remove any combined organic base as pointed out above, or into an organic non-solvent for the ester such as an alcohol or an ether, for instance isopropyl ether, the latter having been disclosed and claimed in Malm and Fordyce application Serial No. 553,646, filed July 28, 1931.

The cellulose esters of the heterogeneously linked dicarboxylic acids obtained by the process of our invention are generally soluble in various pyridine combinations such as pyridine-acetone, pyridine-benzene, pyridine-tetrachlorethane, pyridine-ethylene chloride etc. Any of the latter three combinations may be employed in the process of our invention instead of using pyridine entirely.

Various inert organic solvents may also be employed for dissolving the esters prepared according to our process. For instance a cellulose acetate-diglycollate having a diglycollyl content of approximately 18% was found to be soluble in acetone, methanal-acetone (1:1 and 2:1), ethyl lactate, ethylene chloride-methanol (4:1), propylene chloride-methanol (4:1), 1.4 dioxan and B. methoxyethyl alcohol and also at elevated temperatures in methanol-acetone (3:1 and 4:1), benzene-methanol (2:1), toluene-methanol (1:1) and B. ethoxyethyl alcohol. From a solution of one of our esters of cellulose in one of the above-named solvents (or a solvent suitable for use with a particular ester), a transparent sheet or skin may be formed by spreading the solution on a film-forming surface, such as a polished drum, and coagulating or solidifying in a fluid stream of heated air or a non-solvent liquid. Various plasticizers such as an alkyl phthalate (for example ethyl or butyl), triphenyl or tricresyl phosphate, a B. alkoxy-alkyl phthalate, tributyl phosphate or in fact any plasticizer found suitable may be added to the solution prior to the formation of the skins or sheets to enhance their flexibility. These cellulose esters of heterogeneously linked dicarboxylic acids may also be employed in adhesives, laminated glass, lacquers, artificial silk and molded products either alone or mixed with a plasticizer and other compatible addition products.

The following examples are illustrative of the carrying out of the process of our invention:

*Example I*

20 lbs. of a cellulose acetate having a 35% acetyl content was dissolved in 100 lbs. of pyridine. 40 lbs. of diglycollic anhydride was then added to the solution and the mixture was heated on a steam bath (about 90°–100° C.) for 24 hours. The solution was then thinned with acetone and the ester was precipitated therefrom by pouring the solution into aqueous 10% hydrochloric acid. The ester, which was a cellulose acetate-diglycollate, was washed free from acid with distilled water and dried. The product upon analysis was found to have a diglycollyl content of approximately 30.5%.

*Example II*

The same procedure was followed as was employed in Example I except that a cellulose acetate having an acetyl content of 38% was employed as the starting material. The cellulose acetate-diglycollate formed, upon analysis, was found to have a diglycollyl content of approximately 18.2%.

*Example III*

A mixture of 10 lbs. of cellulose regenerated from viscose, 100 lbs. of pyridine and 50 lbs. of diglycollic anhydride was heated on a steam bath (about 85°–100° C.) for 3 days. The solution resulting was cooled, thinned with acetone and methyl alcohol, and the cellulose diglycollate formed was separated out by pouring the solution into aqueous 10% hydrochloric acid.

As diglycollic acid is the common and recognized representative of the dicarboxylic acids whose carboxyl groups are joined by heterogeneous linkages, the examples are directed to diglycollic esters. However, the anhydrides of other acids of this class may also be employed. For example, the anhydrides of the dilactic acids, dihydracrylic acid or the dicarboxylic acids formed by the ethers of the higher hydroxy monobasic acids (such as the ethers of hydroxy-butyric, hydroxy-valeric acids) may be employed in the process of our invention.

If desired, the anhydrides of the dicarboxylic acids in which the linkages contain sulfur atoms may be employed in our process either instead of or mixed with the anhydrides of the oxygen linked acids. For example, the anhydrides of acids such as thiodiglycollic, thiodilactylic, and thiodibutyric, may be employed if desired.

Instead of pyridine other organic bases, particularly of the tertiary variety, may be employed in the process of our invention. In addition to pyridine other bases such as quinoline and alpha-picoline have been found to be useful in the process of our invention. Other organic bases such as the dialkyl anilines, for instance dimethyl aniline, the hexahydro-dialkyl anilines, dimethyl n-hexyl-amine and the like would at once suggest themselves to those skilled in the art as a group which would supply organic bases suitable for employment as the catalyst in the present invention. As was pointed out above, the organic base employed in our invention may be supplemented by the addition of an organic solvent to the reaction bath. Some of the solvents which are suitable for use in this connection are benzene, tetrachlorethane or ethylene chloride.

In the process of our invention we have reason to believe that the dicarboxylic esters formed therein are combined with the organic base employed in the esterification of the cellulose. We believe that one of the carboxyl groups of the acid is combined with the cellulose molecule, while the other carboxyl group is combined with the organic base, for example pyridine. While these esters containing pyridine (or another base) in combination may have properties fitting them for particular uses, we find it desirable to treat the esters of cellulose we obtain, with an excess of an acid which will free the ester from the combined pyridine, either in the precipitation step or after the separation of the product from the reaction mixture. Although an organic acid such as acetic may be employed for this purpose we prefer to employ a mineral acid such as hydrochloric, sulfuric or the like.

The reactions which are believed to take place in the process of our invention may be represented as follows:

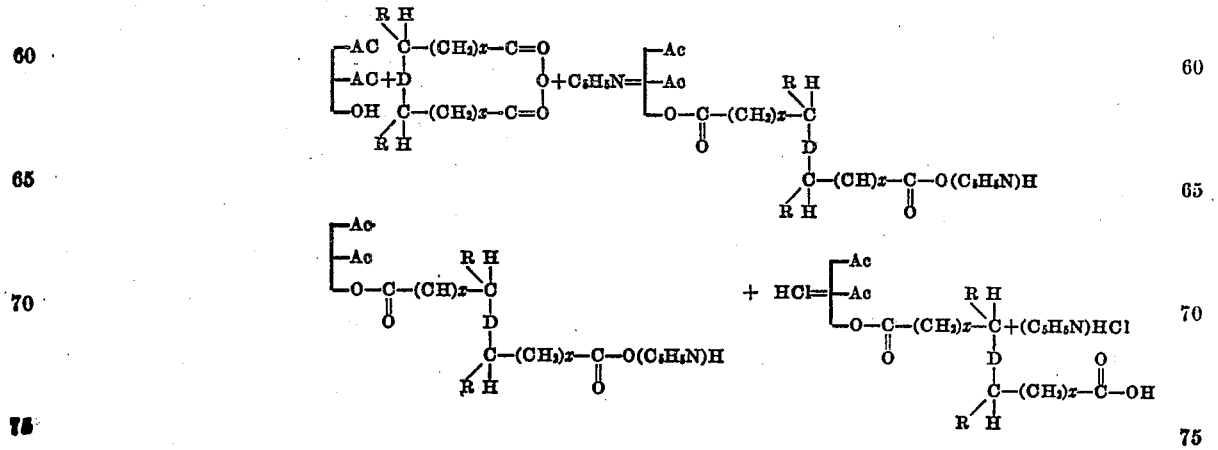

in which

is employed to represent one unit of a partially de-esterfied cellulose acetate based on $C_6H_{10}O_5$ as representing a unit of cellulose, R represents either hydrogen or an alkyl group and D represents at least one O or S and $x$ is either zero or an integer. Although the proportion of two acetyl groups to every hydroxyl group in the cellulose acetate may not hold true of the starting material employed in the usual processes according to our invention, however, for ease of illustration this proportion is employed in the formula.

If desired, the carboxyl group, which has been freed from the pyridine, as described above, may be treated with an organic base such as those named above, or an inorganic base such as potassium, sodium or ammonium hydroxide, whereby a new compound can be made. For instance a cellulose acetate-acid diglycollate may be treated with a base and the reaction taking place in that case may be represented as follows:

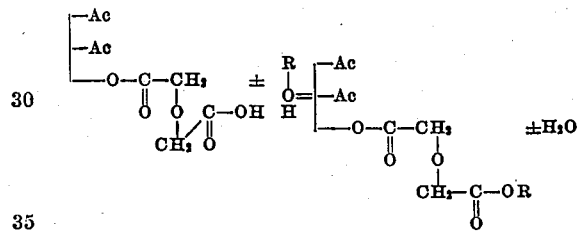

in which R represents an inorganic or organic basic radical. The sodium, potassium and ammonium salts of the heterogeneously linked dicarboxylic acid esters of cellulose or a cellulose acylate are water-soluble. The salts of the other metals such as silver, calcium, mercury, zinc, etc. may be prepared by uniting the metal with the free carboxyl group. Also salts of organic bases, such as the ethanolamines, the preparation of which salts is disclosed and claimed in U. S. Patent #1,969,741, and the like may be prepared if desired.

The cellulose esters of the heterogeneously linked dicarboxylic acids are characterized by their superior adhesive properties. They have been found useful for the laminating of sheets or skins. For instance these esters are eminently suitable for use as an intermediate layer between the base and the sensitized emulsion of photographic film to prevent the emulsion from peeling or stripping off from the film base. They may also be employed as intermediate layers for the laminating of sheets of glass, metals, wood, leather, fabric, etc. These esters may also be employed in various capacities in which the use of organic esters of cellulose is known, such as sheeting, artificial silk, molded products, artificial leather, etc. Inspection of the characteristics of these esters will suggest additional uses in various capacities.

Some of the novel compounds which may be prepared by our invention are: cellulose acetate diglycollate, cellulose acetate dilactate, cellulose acetate dihydracrylate, cellulose diglycollate, cellulose dilactate, cellulose dihydracrylate, cellulose acetate propionate diglycollate, cellulose ethyl ether diglycollate, cellulose acetate diglycollate thiodiglycollate, cellulose acetate diglycollate dilactate, cellulose thiodiglycollate, cellulose acetate lactate, cellulose thiodiglycollate, cellulose acetate thiodiglycollate, cellulose acetate thiodilactate, cellulose silver diglycollate, cellulose acetate potassium diglycollate, and cellulose acetate butyl amine dilactate.

Various other modifications of our invention will be apparent to those skilled in the art and will also come within the scope of our invention. Where the term "heterogeneously linked dicarboxylic acid" is employed herein it refers to those dicarboxylic acids in which the carboxyl groups are linked together by a chain of atoms at least one of which differs from the other atoms in the chain. Where the term "cellulosic materials" is employed herein it refers to either an esterifiable cellulose or a cellulose derivative containing esterifiable hydroxyl groups. Where the symbol

is employed herein it is to be understood as representing a $C_6$ portion of cellulose with three of its hydroxyl groups removed.

We claim as our invention:

1. An ester of cellulose containing the unit

in which $y$ is an organic acyl group, at least one of which has the formula:

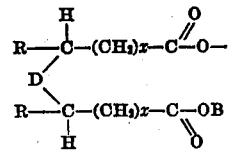

in which $x$ is either zero or an integer, R is either a hydrogen or an alkyl substituent, D is at least one oxygen or sulfur atom and B is either a hydrogen or a basic substituent.

2. Cellulose acetate diglycollate.
3. Cellulose diglycollate.
4. A process for preparing a cellulose ester of an oxygen linked dicarboxylic acid which comprises reacting upon a cellulosic material with the anhydride of the acid in the presence of a tertiary organic base.
5. A process for preparing a cellulose ester of an oxygen linked dicarboxylic acid which comprises reacting upon an esterifiable cellulose derivative with the anhydride of the acid in the presence of a tertiary organic base.
6. A process for preparing a diglycollic acid ester of cellulose which comprises reacting upon a cellulosic material with diglycollic anhydride in the presence of a tertiary organic base.
7. A process for preparing a diglycollic acid ester of cellulose which comprises reacting upon a cellulosic material with diglycollic anhydride in the presence of pyridine.
8. A process for preparing a diglycollic acid ester of cellulose which comprises reacting upon an esterifiable cellulose derivative with diglycollic anhydride in the presence of pyridine.
9. A process for preparing a diglycollic acid ester of cellulose which comprises reacting upon a cellulosic material with diglycollic anhydride in the presence of a tertiary organic base.
10. A heterogeneously linked dicarboxylic acid ester of cellulose, the linkage of which contains at least one atom of a member of the oxygen family of Group VI of the periodic table.
11. A salt of a heterogeneously linked dicarboxylic acid ester of cellulose, the linkage of which contains at least one atom of a member of the oxygen family of Group VI of the periodic table.

12. A process of preparing a cellulose ester of heterogeneously linked dicarboxylic acid which comprises reacting upon cellulosic material with the anhydride of the acid, having at least one atom of a member of the oxygen family of Group VI of the periodic table in the linkage, in the presence of a tertiary organic base.

13. An alkali metal salt of a heterogeneously linked dicarboxylic acid ester of cellulose, the linkage of which contains at least one atom of a member of the oxygen family of Group VI of the periodic table.

14. The sodium salt of a heterogeneously linked dicarboxylic acid ester of cellulose, the linkage of which contains at least one atom of a member of the oxygen family of Group VI of the periodic table.

CARL J. MALM.
CHARLES R. FORDYCE.